(12) United States Patent
Kazmi et al.

(10) Patent No.: US 8,553,667 B2
(45) Date of Patent: Oct. 8, 2013

(54) SETTING MAXIMUM POWER AT A MOBILE COMMUNICATION SYSTEM BASE STATION HAVING MULTIPLE ANTENNAS

(75) Inventors: Muhammad Kazmi, Bromma (SE); Klas Sjerling, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 947 days.

(21) Appl. No.: 12/667,829

(22) PCT Filed: Apr. 23, 2008

(86) PCT No.: PCT/SE2008/050467
§ 371 (c)(1),
(2), (4) Date: Jan. 5, 2010

(87) PCT Pub. No.: WO2009/008805
PCT Pub. Date: Jan. 15, 2009

(65) Prior Publication Data
US 2010/0202431 A1    Aug. 12, 2010

(30) Foreign Application Priority Data
Jul. 6, 2007   (SE) ...................................... 0701653

(51) Int. Cl.
*H04B 7/216*    (2006.01)
(52) U.S. Cl.
USPC .......................................... 370/342; 370/334
(58) Field of Classification Search
USPC ......... 370/342, 437, 318, 329, 334; 375/267; 455/101, 103
See application file for complete search history.

(56) References Cited

U.S. PATENT DOCUMENTS

| 6,662,024 | B2 | 12/2003 | Walton et al. |
| 7,471,963 | B2 | 12/2008 | Kim et al. |
| 7,684,372 | B2 * | 3/2010 | Beale et al. .................... 370/334 |
| 2006/0034382 | A1 * | 2/2006 | Ozluturk et al. ............... 375/267 |
| 2007/0133708 | A1 * | 6/2007 | Lee et al. ....................... 375/267 |

FOREIGN PATENT DOCUMENTS

| RU | 2238611 C1 | 10/2004 |
| RU | 2294599 C2 | 2/2007 |

OTHER PUBLICATIONS

Grant, A. J. et al. "Sub-optimal Power Allocation for MIMO Channels." ISIT 2006, Seattle, Washington, USA, Jul. 9-14, 2006, pp. 2839-2843.

* cited by examiner

*Primary Examiner* — Thai Nguyen
(74) *Attorney, Agent, or Firm* — Coats and Bennett, P.L.L.C.

(57) ABSTRACT

A MIMO-capable base station allocates a maximum transmission power budget to each of its antennas. For serving each of one or more MIMO and non-MIMO users, one or more carriers are allocated. For each carrier, information about an amount of allocated MIMO and non-MIMO user resources associated with the carrier is used to derive coefficients. Each coefficient corresponds to a unique one of the antennas, and represents a proportion of a maximum power budget for the carrier. For each carrier, the coefficients and the maximum transmission power budget for the carrier are used to derive a maximum transmission power budget for each of the antennas. For each antenna, a total maximum transmission power budget for the antenna is derived by combining the derived maximum transmission power budgets of the carriers transmitted on the antenna. The total maximum power budget of the antenna should not exceed a limit for the antenna.

18 Claims, 4 Drawing Sheets

SETTING MAXIMUM POWER AT A MOBILE COMMUNICATION SYSTEM BASE STATION HAVING MULTIPLE ANTENNAS

BACKGROUND

The present invention relates to mobile communication systems, and more particularly to methods and apparatuses for setting maximum power parameters at mobile communication system base stations having multiple antennas.

Multiple Input/Multiple Output (MIMO) processing is an advanced antenna technique for improving spectral efficiency and, thereby, boosting the overall system capacity of a telecommunication system. The use of MIMO processing implies that both the base station and the user equipment employ multiple antennas. There exist a variety of MIMO techniques (or modes). A few of these are: Per Antenna Rate Control (PARC), selective PARC (S-PARC), transmit diversity, receiver diversity, and Double Transmit Antenna Array (D-TxAA). The D-TxAA technique is an advanced version of transmit diversity that is used in the Universal Mobile Telecommunications System (UMTS) Terrestrial Radio Access Network (UTRAN).

Irrespective of the applied MIMO technique, the notation (M×N) is generally used to represent MIMO configurations in terms of the number of transmit antennas (M) and receive antennas (N). The common MIMO configurations used or currently discussed for various technologies are: (2×1), (1×2), (2×2), (4×2), (8×2), and (8×4). Configurations represented by (2×1) and (1×2) are special cases of MIMO and correspond to transmit diversity and receiver diversity, respectively.

The above mentioned MIMO modes as well as other MIMO techniques enable various types of spatial processing to be applied to the transmitted and received signals. The ability to use spatial diversity in general improves spectral efficiency, extends cell coverage, enhances user data rate, and mitigates multi-user interference. In essence, each MIMO technique has its own benefit. For example, the receiver diversity technique (1×2) particularly improves coverage. By contrast, (2×2) MIMO techniques, such as D-TxAA, lead to increased peak user bit rates.

Although MIMO can be used to enhance the data rate, MIMO transmission also involves an increase in processing complexity and consumes more User Equipment (UE) battery power than non-MIMO transmissions. Therefore, MIMO processing is particularly feasible for high data rate transmissions. In UTRAN, high data rates are mapped onto the downlink shared channel (HS-DSCH). The embedded or in-band higher layer signaling, which may also be multiplexed on the HS-DSCH, could therefore be transmitted using MIMO.

By contrast, separate signaling or channels containing dedicated physical or higher layer signaling should preferably be transmitted using a conventional antenna technique (e.g., single antenna case). An example is UTRAN's use of an associated dedicated channel to run power control; sometimes this channel also carries higher layer signaling. Similarly, in soft handover the low bit rate dedicated channels could still be transmitted via one antenna.

The use of MIMO leads to significantly better performance compared to the baseline scenario of single transmit and receive antennas. But since a network may have to support both MIMO and non-MIMO user equipment, those user equipments supporting MIMO inform the network about their capability at the time of call setup or when doing registration processes. Certain technologies may support more than one MIMO mode. This means that, in one scenario, a particular base station may support all possible MIMO modes allowed by the corresponding standard while, in another scenario, the base station may offer only a sub-set of MIMO modes. In the basic arrangement, the base station may not offer any MIMO operation; that is, it may support only single transmit antenna operation. Therefore, the actual use of a particular MIMO technique is possible in scenarios when both the serving base station and user equipment bear the same MIMO capability.

There are two basic MIMO deployment scenarios: In a "MIMO only" scenario it is assumed that the serving base station, as well as all user equipments served by that base station, support the same MIMO technique, e.g. D-TXAA in case of UTRAN. This scenario is not very realistic because, in practice, there will almost always be low-end user equipments that do not support MIMO. However, it might be the case that, at times, all users in a cell have MIMO capability. At any given moment, the serving base station or the corresponding Radio Network Controller (RNC) in UTRAN will be fully aware of the multi-antenna capabilities of the user equipments it is serving. However, even when all users are MIMO capable, there might still be scenarios and occasions when the network may use single antennas for transmission of data and/or user-specific signaling. For example, low data rates could still be transmitted using single transmitted antennas. Also, congestion may force the network to use only single antenna transmissions even for high data rate services.

The second MIMO deployment scenario involves a mix of MIMO and non-MIMO users; that is, a mixture of users that are MIMO capable and those that only support the baseline configuration (i.e. single antenna transmission). This is a more realistic scenario. The baseline users (i.e., non-MIMO users) are likely either legacy users from earlier releases of the standard or are low end users.

Figure 1:
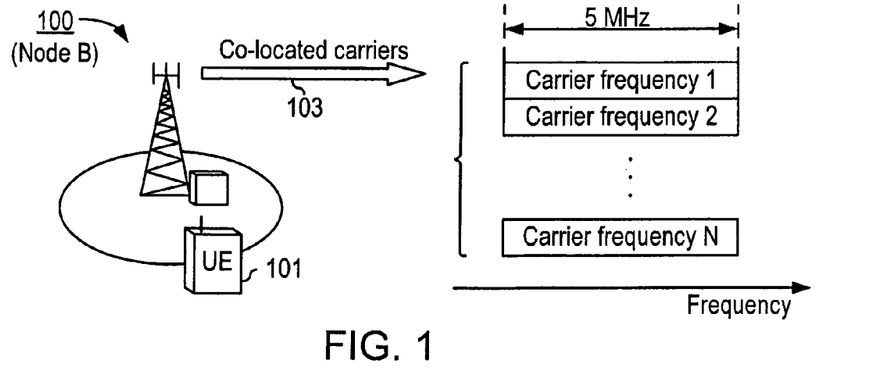
FIG. 1 is a schematic diagram of a Node B in a UTRAN system.

In many densely populated areas, such as hotspots, an operator deploys more than one cell in the same geographical area (e.g., several cells in one sector). Each base station or Node B typically provides coverage to three sectors. As an example, a deployment with two carriers per Node B implies two co-located cells per sector and six cells per Node B. FIG. 1 is a schematic diagram of a Node B 100 in a UTRAN system. A user equipment 101 is representative of one or more user equipments that might be served by the Node B 100. The six so-called "co-located cells" are supported by the Node B's use of co-located carriers 103 which, in a UTRAN system, are each 5 MHz, as shown in FIG. 1.

Figure 2:
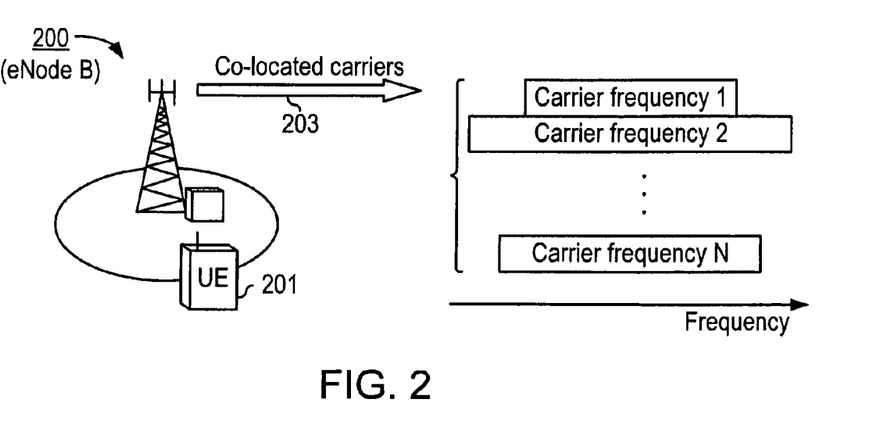
FIG. 2 is a schematic diagram of an eNode B in an E-UTRAN system.

A similar arrangement is conceivable in an evolved UTRAN (E-UTRAN) system. FIG. 2 is a schematic diagram of an eNode B 200 in an E-UTRAN system. A user equipment 201 is representative of one or more user equipments that might be served by the eNode B 200. The six co-located cells are supported by the eNode B's use of co-located carriers 203. Due to variable carrier frequencies in E-UTRAN, the co-located cells may have different bandwidths and, therefore, different maximum transmission power levels. The co-located carriers 203 having different bandwidths is shown in FIG. 2. However, even in E-UTRAN, the most common deployment scenario involves the co-located carriers 203 having the same bandwidth as one another.

In UTRAN systems, the co-located cells are likely to have the same maximum transmission power level. However, the value of the maximum transmission power level depends upon the base station class. For example, the maximum transmission power level in macro-cells can be 43 dBm, whereas in smaller cells (e.g. pico-cells), the maximum power budget is much lower (e.g. 24 dBm).

For E-UTRAN systems, in which the frequency bandwidth of a cell can be between 1.4 MHz to 20 MHz, the maximum cell power for a 20 MHz bandwidth can be up to 46 dBm in macro cells. By comparison, in cells having a smaller bandwidth, the maximum transmission power will be lower. The transmission in co-located cells will be served by multi-carrier power amplifiers (MCPA). An MCPA imposes limits on the maximum total transmission power per base station (or Node B or eNode B) as well as on the maximum transmission power per carrier (or co-locate cell). For convenience, the term "base station" is used throughout this specification and claims to denote not only traditional base stations, for example those employed in a system in accordance with Global System for Mobile communication (GSM) standards, but also Node Bs, eNode Bs, and any other equivalent node in a telecommunications system.

The total transmitted power per cell is limited. Therefore the maximum power available in a cell will be split between the transmitted antennas. If it is assumed that there are K co-located cells (or, equivalently, frequency carriers) and L antennas in a base station (e.g., Node B or eNode B) and that the maximum power setting per antenna for antenna "j" for a given carrier frequency "i" at a base station BS is denoted $P_{ij}$, then these terms can be used to form a maximum base station power matrix, $M_{max}^{BS}$, for the base station, 'BS', on a linear scale. The maximum total base station power ($P_{max}^{BS}$) can be derived as follows:

$$M_{max}^{BS} = \begin{bmatrix} p_{11} & p_{12} & K & p_{1L} \\ p_{21} & p_{22} & K & p_{2L} \\ M & M & M & \\ p_{K1} & p_{K2} & L & p_{KL} \end{bmatrix}$$

where each term $p_{ij}$ ($1 \leq i \leq K$ and $1 \leq j \leq L$) can be considered to be a coefficient, $c_{ij}$ times a maximum transmission power budget for a carrier i ($P_{max}^i$).

Thus, the total maximum transmitted power of all the antennas for a particular carrier frequency 'i' can be expressed as $$\sum_{j=1}^{L} p_{ij} = \sum_{j=1}^{L} c_{ij} P_{max}^i = P_{max}^i.$$

The total maximum transmitted power of all the antennas and of all the available carrier frequencies within the base station, 'BS', can then be expressed as $$\sum_{i=1}^{K} P_{max}^i = P_{max}^{BS}.$$

The maximum transmission power in a base station will be set and maintained according to the equations above. However, these are general expressions that offer no guidance with respect to how to determine actual maximum transmission power settings. The settings used in state of the art technologies (e.g., UTRAN, E-UTRAN, etc) are described below.

The extent of cell downlink coverage is determined by the setting of common channel power levels. When MIMO is used at the base station the common channels (such as BCH, SCH, or channels containing pilot sequences) are generally transmitted from all or at least more than one antenna. However, their power settings can be different on different antennas. For instance, one of the antennas can be regarded as the primary antenna. The transmitted power of the common pilot sequence (e.g. as transmitted on the Common Pilot Channel—"CPICH"—in UTRAN) can be larger on the primary antenna than on any of the remaining antennas. For example, in the case of (2×2) MIMO, in a typical arrangement in UTRAN the CPICH power on the primary antenna can be twice that of the CPICH power set on the secondary antenna. This ensures good cell coverage of the non-MIMO users, which are generally served by the primary antenna.

The UE identifies cells and estimates the channel from the pilot sequences sent on the common channels (e.g., SCH, CPICH, etc.). Further, important radio resource functions like cell reselection, handover decisions, and the like, are also based on the measurements performed on the signals sent via the common channels. Therefore, in order to ensure consistent cell coverage, the power of the common channels on all the antennas remains fixed even if the maximum power per antenna is varied.

Regarding the UTRAN maximum power setting, the available transmission power budget per cell (i.e., $P_{max}^C$) is equally allocated among the multiple antennas. Since the same bandwidth (e.g., 5 MHz) is used in all of the co-located cells, the maximum base station transmission power matrix ($M_{max}^{BS}$) can be expressed as $$M_{max}^{BS} = \begin{bmatrix} \dfrac{P_{max}^C}{L} & \dfrac{P_{max}^C}{L} & K & \dfrac{P_{max}^C}{L} \\ \dfrac{P_{max}^C}{L} & \dfrac{P_{max}^C}{L} & K & \dfrac{P_{max}^C}{L} \\ M & M & M & M \\ \dfrac{P_{max}^C}{L} & \dfrac{P_{max}^C}{L} & \Lambda & \dfrac{P_{max}^C}{L} \end{bmatrix}.$$

The value $$\frac{P_{max}^C}{L}$$

includes the power of the common channels, MIMO users and non-MIMO users. As there are K cells per base station, the maximum total base station power ($P_{max}^{BS}$) can be expressed as $P_{max}^C \times K = P_{max}^{BS}$.

To illustrate the point, for the case of (2×2) MIMO in a macro-cell environment and assuming two carrier frequencies per base station, the maximum base station power matrix can be represented as:

$$M_{max}^{BS} = \begin{bmatrix} 10 & 10 \\ 10 & 10 \end{bmatrix}.$$

Regarding the E-UTRAN maximum power setting, the available transmission power budget per cell in cell "i" (i.e. $P_{max}^i$) is also allocated equally among the multiple antennas. However, the maximum power per cell within the same base station (e.g., eNode B) may be different for the different cells if they have different carrier bandwidths from one another. In case the same bandwidth is used in all the co-located cells, the maximum base station power matrix ($M_{max}^{BS}$) will be the same as that set forth above for the case of UTRAN. However, if different carrier bandwidths are used in the co-located cells, then the maximum base station power matrix ($M_{max}^{BS}$) will be given by $$M_{max}^{BS} = \begin{bmatrix} \frac{P_{max}^1}{L} & \frac{P_{max}^1}{L} & K & \frac{P_{max}^1}{L} \\ \frac{P_{max}^2}{L} & \frac{P_{max}^2}{L} & K & \frac{P_{max}^2}{L} \\ M & M & M & M \\ \frac{P_{max}^K}{L} & \frac{P_{max}^K}{L} & \Lambda & \frac{P_{max}^K}{L} \end{bmatrix}.$$

As before, each component $$\frac{P_{max}^i}{L}$$

of the matrix includes the power of common channels, MIMO users and non-MIMO users. As there are K cells per base station, the maximum total base station power ($P_{max}^{BS}$) can be expressed as $$\sum_{i=1}^{K} P_{max}^i = P_{max}^{BS}.$$

To illustrate this with an example, for the case of (2×2) MIMO with two carriers per base station (e.g., eNode B) used in macro-cellular environment and assuming that carrier#1 and carrier#2 have bandwidths of 10 MHz and 20 MHz, respectively, the corresponding maximum power budgets per carrier for carrier#1 and carrier#2 are 40 W and 20 W respectively. The total maximum power per antenna is thus $$M_{max}^{BS} = \begin{bmatrix} 20 & 20 \\ 10 & 10 \end{bmatrix}.$$

For both UTRAN an E-UTRAN, it is the case that the base station can make full use of the base station transmitted power resources only if all users served by the same base station support MIMO and if all of these users are served by using the full MIMO capabilities of the UE and the serving base station. However, in practice, it is unlikely that these conditions will often be satisfied because it is highly probable that there will be a mixture of MIMO and non-MIMO users (using single transmit antenna) in a cell whereof the latter users will be served by the primary antenna. Secondly even if all users are MIMO capable, some of them may not be served with all possible antennas all the time. For at least these reasons, the strategy of allocating a maximum transmitted power budget equally among multiple antennas is not optimal.

It is therefore desired to have methods and apparatuses that allocate maximum transmitted power budgets among multiple base station antennas in a way that allows the base station to make better use of its total transmitted power resources.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that operate a base station to accomplish allocating a maximum transmission power budget to each of a number of transmit antennas. The base station comprises a plurality of transmit antennas and is capable of using Multiple Input/Multiple Output (MIMO) processing to serve one or more MIMO users and is also capable of serving one or more non-MIMO users. Each of the antennas transmits on one or more carriers selected from a set of co-located carriers, wherein each of the non-MIMO users is served by only one of the antennas and each of the MIMO users is served by two or more of the antennas. Allocating the maximum transmission power budget to each of the transmit antennas involves, for each of the MIMO users, allocating one or more carriers, selected from the set of co-located carriers, for use in serving the MIMO user. Also, for each of the non-MIMO users, one or more carriers, selected from the set of co-located carriers, are allocated for use in serving the non-MIMO users.

For each carrier of the set of co-located carriers, information about an amount of allocated MIMO user resources associated with the carrier and an amount of allocated non-MIMO user resources associated with the carrier is used to derive a set of coefficients, wherein each coefficient corresponds to a unique one of the antennas, and each coefficient represents a proportion of a maximum power budget for the carrier. For each carrier of the set of co-located carriers, the coefficients and the maximum transmission power budget for the carrier are used to derive a maximum transmission power budget for each of the antennas. For each antenna of the plurality of transmit antennas, a total maximum transmission power budget is derived for the antenna by combining the derived maximum transmission power budgets of the carriers transmitted on the antenna. Also, it is determined whether the total maximum transmission power budget of the antenna exceeds a transmission power limit for the antenna.

In some embodiments, the allocation of carriers is such that MIMO users and non-MIMO users are distributed equally across all carriers.

In some embodiments, the amount of allocated MIMO user resources includes an amount of transmitted power or used channels of the MIMO users in a cell; and the amount of allocated non-MIMO user resources includes an amount of transmitted power or used channels of the non-MIMO users in the cell. In some of these embodiments, the channels are channelization codes of a code division multiple access radio access network. They may alternatively be sets of sub-carriers or sets of resource blocks in an orthogonal frequency division multiple access radio access network.

In some embodiments, for each carrier of the set of co-located carriers, one of the antennas is a primary antenna that serves one or more MIMO users and one or more non-MIMO users, and remaining ones of the antennas are secondary antennas that serve one or more MIMO users. In some cases, a same one of the antennas is the primary antenna for all of the carriers. Alternatively, a different one of the antennas is the primary antenna for each of the carriers.

In another aspect of embodiments consistent with the invention, if it is determined that the total maximum transmission power budget of the primary antenna of a carrier exceeds the transmission power limit of the primary antenna of the carrier, then it is determined whether radio conditions for a non-MIMO user satisfy one or more predefined criteria, and if so, then one of the secondary antennas of the carrier is caused to be used to serve the non-MIMO user if the radio conditions of the non-MIMO user satisfy the one or more predefined criteria. In some of these embodiments, an identifier of the secondary antenna to be used to serve the non-MIMO user is communicated to the non-MIMO user.

In yet another aspect of embodiments consistent with the invention, for each of one or more of the carriers, a total maximum transmission power budget is derived for the carrier by combining the derived maximum transmission power budgets of the antennas for said one of the carriers. If it determined that the total maximum transmission power budget for the carrier exceeds a transmission power limit for the carrier, then one or more non-MIMO users presently receiving service on the carrier are caused to instead receive service on an available target carrier. In an aspect of some of these embodiments, the non-MIMO users receive service on a primary antenna of the target carrier if the service will not cause a total transmission power of the primary antenna to exceed the total maximum transmission power budget of the primary antenna (509). However, the non-MIMO users receive service on one of the secondary antennas of the target carrier if the service will cause a total transmission power of the primary antenna to exceed the total maximum transmission power budget of the primary antenna.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In an aspect of embodiments consistent with the invention, practical deployments of MIMO-based communication systems make better use of available transmission power by setting maximum antenna transmission power budgets dynamically. As there is a limitation of the total maximum transmitted power per antenna over all carriers, various embodiments make it possible for the powers between the carriers from the same antenna to be varied.

In one aspect, a base station equipped with multiple transmit antennas is operated so as to dynamically set the maximum power per antenna such that the total power of all the transmit antennas on the same carrier remains within a certain limit while at the same time ensuring that the total maximum power of all the carriers on each antenna remains within a certain limit. The dynamic setting of the maximum antenna transmitted power is based on the distribution of MIMO and non-MIMO users. In some, but not necessarily all, embodiments, the maximum power is set in a way that ensures that all users (non-MIMO users or MIMO users using single transmit antenna at a given time) maintain the same desired coverage in the downlink. This can be achieved, for example, by equally distributing the load of MIMO and non MIMO users on all the carriers within a sector.

In case the optimum maximum power per antenna is not achievable, the users (especially non-MIMO users) with good coverage (e.g., non-MIMO users that are close to the transmission antennas) could be served by the secondary antennas or could be served by primary or secondary antennas on another carrier. The present invention implies, among other things, the advantages of making more efficient use of the transmission power; enabling all users to have good coverage; and ensuring that non-MIMO users will not be adversely affected due to MIMO users.

These and other aspects of embodiments consistent with the invention will now be described in further detail.

One aspect of embodiments consistent with the invention is the ability to dynamically set the maximum power per antenna in a way that ensures good coverage for all users (i.e., MIMO and non-MIMO users) in a cell. It is therefore important to carefully consider the criteria to be used for determining the maximum power budget per antenna. In an initial step, the base station allocates carriers for serving MIMO and non-MIMO users. In some embodiments, this involves the base station attempting to equally distribute the non-MIMO and MIMO users among all the carriers in the same sector (i.e., among the co-located cells). To maintain an equal distribution, this remains a consideration when selecting a carrier for use by a new user who enters or during the call. The non-MIMO users are typically served by the primary antenna, whereas the MIMO users are served on both primary and secondary antennas.

The base station also keeps track of the relative distribution of non-MIMO and MIMO users on each carrier. This latter information can be used to allocate the actual maximum power per antenna on each carrier.

Generally, the maximum power per antenna is set according to two factors. One of these factors is a MIMO users' factor ($\Psi_{MU}$) and the other is a non-MIMO users' factor ($\Psi_{SU}$). These factors $\Psi_{MU}$ and $\Psi_{SU}$ are a function of used radio resources (e.g., average or a certain percentage) of the active users in a cell or carrier frequency "i" and can be expressed as a function of radio resources used over the past measurement interval ($T_0$):

$$\Psi_{MU} = f_1(R_{MU}, R_{SU}) \text{ and}$$

$$\Psi_{SU} = f_2(R_{MU}, R_{SU})$$

where $R_{MU}$ and $R_{SU}$ represent radio resources that are used by all MIMO users and non-MIMO users, respectively, in the same cell (or carrier) across all the transmission antennas. The radio resources are in turn functions of the transmission power and the channel resources.

In UTRAN, or any other CDMA-based system, the channel resources represent the channelization codes. In E-UTRAN, or any other OFDMA-based system, the channel resources represent resource blocks or one or more sets of sub-carriers. Therefore, $R_{MU}$ can be expressed in terms of transmitted power ($P_{MU}$) and the number of channels used ($C_{MU}$) by MIMO users in all antennas on the same carrier: $R_{MU} = f_3(P_{MU}, C_{MU})$. Similarly, $R_{SU}$ can be expressed in terms of transmitted power ($P_{SU}$) and the number of channels used ($C_{SU}$) by non-MIMO users: $R_{SU} = f_4(P_{SU}, C_{SU})$.

To illustrate the point with a specific example, one way of estimating the MIMO and non-MIMO factors $\Psi_{MU}$ and $\Psi_{SU}$ involves considering only the power resources:

$$\Psi_{MU} = \frac{P_{MU}}{P_{MU} + P_{SU}} \text{ and } \Psi_{SU} = \frac{P_{SU}}{P_{MU} + P_{SU}}.$$

In another exemplary embodiment, only the channel usage is considered (e.g., in terms of codes or resource blocks):

$$\Psi_{MU} = \frac{C_{MU}}{C_{MU} + C_{SU}} \text{ and } \Psi_{SU} = \frac{C_{SU}}{C_{MU} + C_{SU}}.$$

In still another exemplary embodiment, both the transmit power and channel usage are taken into account with factors that satisfy:

$$\Psi_{MU} = \frac{\alpha}{2}\left(\frac{P_{MU}}{P_{MU} + P_{SU}}\right) + \frac{\beta}{2}\left(\frac{C_{MU}}{C_{MU} + C_{SU}}\right) \text{ and}$$

$$\Psi_{SU} = \frac{\alpha}{2}\left(\frac{P_{SU}}{P_{MU} + P_{SU}}\right) + \frac{\beta}{2}\left(\frac{C_{SU}}{C_{MU} + C_{SU}}\right),$$

where $\alpha + \beta = 1$.

The MIMO and non-MIMO factors are calculated on a per carrier basis. In one base station there could be more than one carrier, as described earlier. Therefore, there are a number of possible ways to use these factors:

One of these is to use MIMO and non-MIMO distribution or load factors independently in each cell within the same base station. In this case, the MIMO and non-MIMO factors for a cell "i" will be $\Psi_{MU}^i$ and $\Psi_{SU}^i$ respectively. If the loads of non-MIMO and MIMO users are equally distributed on all carriers, then the non-MIMO and MIMO distribution factors are the same on all carriers. That is, there is one set of values for $\Psi_{MU}$ and $\Psi_{SU}$. Having one set of values is beneficial for setting the optimal maximum power per antenna in accordance with the calculated MIMO and non-MIMO distribution factors.

An alternative way of using the MIMO and non-MIMO factors is to use one set of aggregate MIMO and non-MIMO factors in all the cells within the same base station. In this case, the overall or aggregate factors could be, for example, the average, minimum, or maximum of all the factors from all the carriers. Functions representing an average MIMO factor ($\overline{\Psi}_{MU}$) and a non-MIMO factor ($\overline{\Psi}_{SU}$) are expressed as:

$$\overline{\Psi}_{MU} = \sum_{i=1}^{K} \frac{\Psi_{MU}^i}{L}$$

and $$\overline{\Psi}_{SU} = \sum_{i=1}^{K} \frac{\Psi_{SU}^i}{L}.$$

Similarly, functions based on the minimum of the MIMO factors ($\Psi_{MU}^{min}$) and the non-MIMO factors ($\Psi_{SU}^{min}$) from all carriers are represented by $$\Psi_{MU}^{min} = \min(\Psi_{MU}^1, \Psi_{MU}^2, L, \Psi_{MU}^K)$$

and $$\Psi_{SU}^{min} = \min(\Psi_{SU}^1, \Psi_{SU}^2, L, \Psi_{SU}^K).$$

Using the MIMO and non-MIMO factors derived above, the maximum power per carrier per antenna is derived while satisfying the constraints that a) the total power of all the transmit antennas on the same carrier remains within a certain limit and b) that the total maximum power of all the carriers on each antenna also remains within a certain limit.

The actual power allocation can be derived on several different bases: One derivation is for the case in which the same maximum power is used on all carriers. Another is for the case in which different maximum power values are used on the various carriers.

Considering first the case in which the same power is used in all the carriers in the same base station, the power per antenna can be derived according to the matrix:

$$M_{max}^{BS} = P_{max}^C \begin{bmatrix} \left(\frac{\Psi_{MU}}{L} + \Psi_{SU}\right) & \frac{\Psi_{MU}}{L} & K & \frac{\Psi_{MU}}{L} \\ \left(\frac{\Psi_{MU}}{L} + \Psi_{SU}\right) & \frac{\Psi_{MU}}{L} & K & \frac{\Psi_{MU}}{L} \\ M & M & M & M \\ \left(\frac{\Psi_{MU}}{L} + \Psi_{SU}\right) & \frac{\Psi_{MU}}{L} & L & \frac{\Psi_{MU}}{L} \end{bmatrix}. \quad (1)$$

The principle in the example of Equation 1 is to have the first antenna as the primary antenna, by which both MIMO and non-MIMO users are served. The secondary antennas will be used by MIMO users. In the matrix above, the primary antenna is the first antenna (or in the more general case, a same one of the antennas) on all the carriers in the same base station.

When assuming that the primary antenna is different on each carrier, the maximum transmission power per antenna can be expressed as $$M_{max}^{BS} = P_{max}^C \begin{bmatrix} \left(\frac{\Psi_{MU}}{L} + \Psi_{SU}\right) & \frac{\Psi_{MU}}{L} & K & \frac{\Psi_{MU}}{L} \\ \frac{\Psi_{MU}}{L} & \left(\frac{\Psi_{MU}}{L} + \Psi_{SU}\right) & K & \frac{\Psi_{MU}}{L} \\ M & M & M & M \\ \frac{\Psi_{MU}}{L} & \frac{\Psi_{MU}}{L} & L & \left(\frac{\Psi_{MU}}{L} + \Psi_{SU}\right) \end{bmatrix}. \quad (2)$$

In some circumstances, having a different one of the antennas acting as the primary antenna on different carriers makes it easier to allocate power while satisfying all necessary constraints.

The matrix values above are based on average MIMO and non-MIMO factors; however, it is possible to also use any other suitable function, for instance cell specific MIMO and non-MIMO factors. Further, since the MIMO and non-MIMO factors ($\Psi_{MU}$ and $\Psi_{SU}$) vary over time, the matrix values should be updated dynamically in order to maintain the best allocation of power.

The case in which the maximum power is different on different carriers is expressed by the term $$\frac{P_{max}^i}{L}.$$

When assuming that the primary antenna is the first or the same antenna on all carriers within the same base station the maximum base station power matrix can be expressed by $$\begin{bmatrix} P_{max}^1 \left(\frac{\Psi_{MU}}{L} + \Psi_{SU}\right) & P_{max}^1 \frac{\Psi_{MU}}{L} & K & P_{max}^1 \frac{\Psi_{MU}}{L} \\ P_{max}^2 \left(\frac{\Psi_{MU}}{L} + \Psi_{SU}\right) & P_{max}^2 \frac{\Psi_{MU}}{L} & K & P_{max}^2 \frac{\Psi_{MU}}{L} \\ M & M & M & M \\ P_{max}^K \left(\frac{\Psi_{MU}}{L} + \Psi_{SU}\right) & P_{max}^K \frac{\Psi_{MU}}{L} & L & P_{max}^K \frac{\Psi_{MU}}{L} \end{bmatrix}. \quad (3)$$

When assuming that the primary antenna is different for each carrier within the same base station, the maximum base station power matrix can be expressed by $$\begin{bmatrix} P_{max}^1 \left(\frac{\Psi_{MU}}{L} + \Psi_{SU}\right) & P_{max}^1 \frac{\Psi_{MU}}{L} & K & P_{max}^1 \frac{\Psi_{MU}}{L} \\ P_{max}^2 \frac{\Psi_{MU}}{L} & P_{max}^2 \left(\frac{\Psi_{MU}}{L} + \Psi_{SU}\right) & K & P_{max}^2 \frac{\Psi_{MU}}{L} \\ M & M & M & M \\ P_{max}^K \frac{\Psi_{MU}}{L} & P_{max}^K \frac{\Psi_{MU}}{L} & L & P_{max}^K \left(\frac{\Psi_{MU}}{L} + \Psi_{SU}\right) \end{bmatrix}. \quad (4)$$

As before, since the MIMO and non-MIMO factors ($\Psi_{MU}$ and $\Psi_{SU}$) vary over time, it is beneficial to dynamically update the matrix values. Also, the matrix values above are based on average MIMO and non-MIMO factors; however, it is possible to also use any other suitable function, for instance cell specific MIMO and non-MIMO factors.

The following illustrates two examples of maximum transmission power allocations:

Example 1

TABLE 1

| Parameter | Value |
|---|---|
| Carriers | 2 |
| Maximum power: carrier#1 | 20 watts |
| Maximum power: carrier#2 | 20 watts |
| $\Psi_{SU}$ | 0.4 |
| $\Psi_{MU}$ | 0.6 |
| MIMO scheme | (2 × 2) |

The example according to Table 1 above considers aggregate MIMO and aggregate non-MIMO factors based on averaging the factors derived for all of the carriers and uses the MIMO and non-MIMO factors to calculate the allocated power per antenna on each carrier. While this scenario is valid for cases in which MIMO and non-MIMO users are equally distributed across all carries, equal distribution of the MIMO and non-MIMO users is not required in all embodiments. This solution can work if the maximum total power limit per antenna is at least 20 W (i.e., greater than or equal to the total power per carrier). Applying the values of Table 1 to Equation 2 yields the following base station maximum power matrix:

$$M_{max}^{BS} = \begin{bmatrix} 14 & 6 \\ 6 & 14 \end{bmatrix}. \quad (5)$$

Example 2

TABLE 2

| Parameter | Value |
|---|---|
| Carriers | 2 |
| Maximum power: carrier#1 | 20 watts |
| Maximum power: carrier#2 | 20 watts |
| $\Psi_{SU}^1$ | 0.4 |
| $\Psi_{MU}^1$ | 0.6 |
| $\Psi_{SU}^2$ | 0.2 |
| $\Psi_{MU}^2$ | 0.8 |

Instead of using the same MIMO and non-MIMO factors across all carriers, this example considers instead the MIMO and non-MIMO factors for each cell (co-located carrier) separately, and uses these along with other information in Table 2 to calculate the allocated power per antenna on each carrier. This results in the following base station maximum transmission power matrix:

$$M_{max}^{BS} = \begin{bmatrix} 14 & 6 \\ 8 & 12 \end{bmatrix}. \quad (6)$$

For this example, this solution works provided the maximum total power limit per antenna is larger than 22 W.

Figure 3:
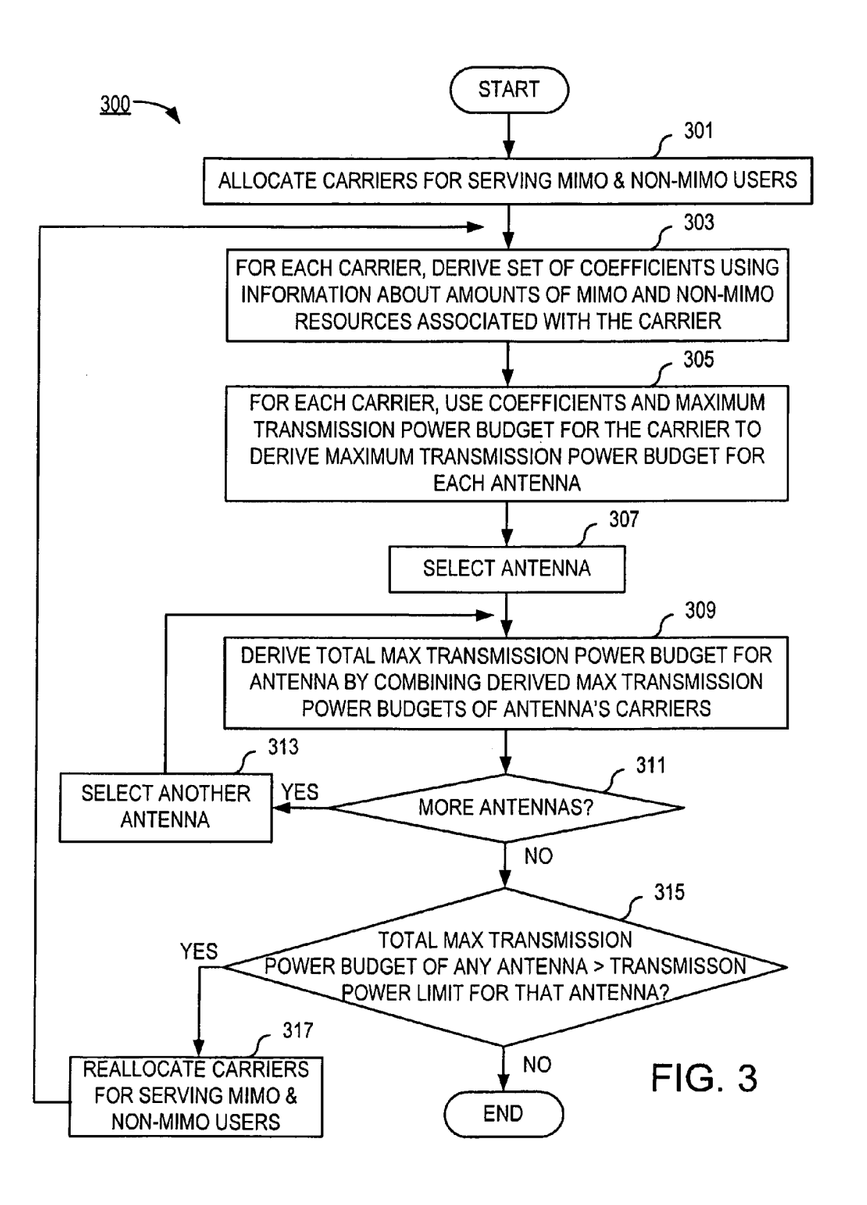
FIG. 3 is, inter alia, a flowchart of exemplary steps/processes carried out in a base station apparatus in accordance with aspects of the invention.

FIG. 3 is a flowchart of exemplary steps/processes carried out in a base station apparatus in accordance with aspects of the invention. FIG. 3 can also be considered to depict an exemplary base station apparatus 300 having logic configured to carry out the variously described functions. It should be recognized that here, as well as in the rest of the specification (including the claims), any reference to carriers should also be considered to be an equivalent reference to a co-located cell.

The process begins by allocating carriers for serving MIMO and non-MIMO users (step 301). Once this has been completed, the coefficients that make up the maximum base station transmission power matrix, $M_{max}^{BS}$, are then ascertained. This can be accomplished by, for example, considering the matrix one row at a time (i.e., one carrier at a time). Thus, for each carrier, a set of coefficients is derived by using information about the amounts of MIMO and non-MIMO resources associated with that carrier (step 303). This, for example, can involve determining any of the various MIMO and non-MIMO factors described earlier, and combining and/or adjusting them in any of the various ways described above to form coefficients that represent a proportion of a maximum power budget to be allocated to a particular antenna on the carrier being considered.

Then, for each carrier, the coefficients and the maximum transmission power budget for the carrier are used to derive a maximum transmission power budget for each antenna (step 305). For example, for each antenna, the corresponding coefficient for a given carrier is multiplied by the maximum transmission power budget for that carrier.

The columns of the maximum base station transmission power matrix, $M_{max}^{BS}$, are then processed one at a time to derive a total maximum transmission power budget for each antenna. In this exemplary embodiment, this involves selecting one of the antennas (step 307), and deriving the total maximum transmission power budget for that antenna by combining (e.g., adding) the maximum transmission power budgets that were previously derived for each of the carriers served by that antenna (step 309). If there are more antennas (matrix columns) to be processed ("YES" path out of decision block 311), then another antenna (matrix column) is selected (step 313), and processing reverts back to step 309.

Eventually, the total maximum transmission power budget will have been derived for each of the antennas ("NO" path out of decision block 311), at which point a determination is made to see whether the total maximum transmission power budget of any of the antennas exceeds a transmission power limit for that antenna (decision block 315). If it does ("YES" path out of decision block 315), then another (different) allocation of carriers to MIMO and non-MIMO users is made (step 317), and the process of deriving the maximum transmission power budgets is repeated, starting at step 303. Reallocation of carriers can, for example, involve reallocation of non-MIMO users to a (possibly different) secondary antenna.

The following describes further aspects of embodiments consistent with the invention with regard to load shifting to a secondary antenna or to another carrier.

Figure 4:
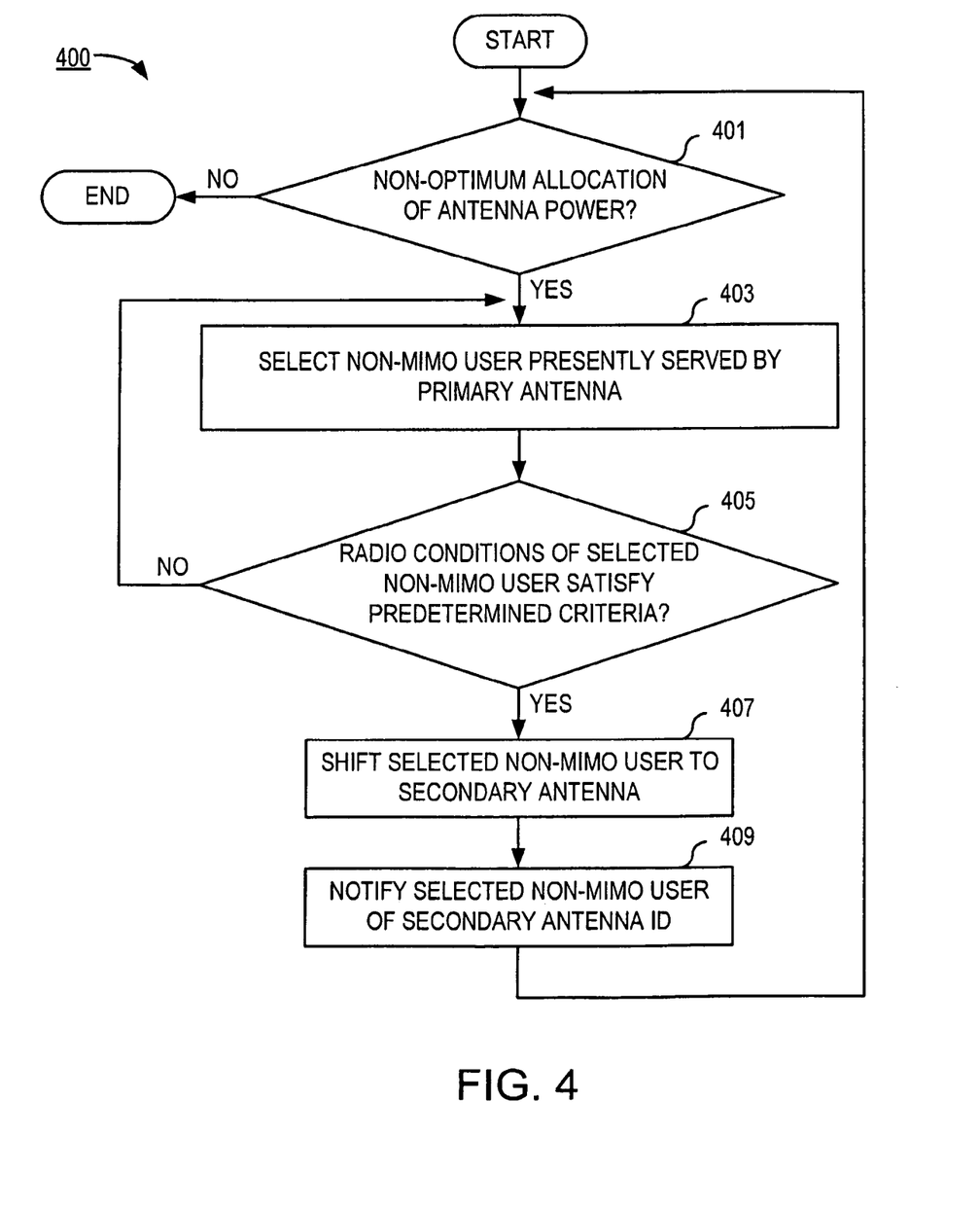
FIG. 4 is, inter alia, a flowchart of exemplary steps/processes carried out in a base station apparatus to handle cases in which a non-optimum allocation of power to one or more transmit antennas has been made.

The principles described above may not always lead to an optimum allocation of the powers per antenna in all scenarios. This can be handled in a number of different ways. FIG. 4 is a flowchart of exemplary steps/processes carried out in a base station apparatus to handle such cases. FIG. 4 can also be considered to be a base station apparatus 400 comprising logic configured to carry out the variously described functions.

Accordingly, a determination is made whether the allocation of maximum transmission power budgets for the carriers served by the various antennas is non optimum (decision block 401). The non-MIMO users use only one antenna, and it is preferably the primary antenna for all non-MIMO users. If the power allocation per antenna for each carrier is optimum, then all non-MIMO users are served by the same antenna (e.g., the primary antenna). Achieving this optimum condition involves dynamically allocating the power. However, depending on the load of non-MIMO and MIMO users, it may not be possible to achieve the optimum condition. A goal of dynamic allocation of power as described herein is to achieve the optimum condition as much as possible. Accordingly, if a non-optimum allocation of maximum transmission power budgets for the carrier served by the various antennas does not exist ("NO" path out of decision block 401), then no further actions need be taken.

However, if a non-optimum allocation of antenna power is detected ("YES" path out of decision block 401), then an attempt will be made to shift one or more non-MIMO users from a primary antenna to a secondary antenna, so that the network will transmit data to those non-MIMO users by means of the secondary antenna. This can be done if the non-MIMO user's radio conditions are sufficiently good. This is because the secondary antenna may use less of the common channel power. Therefore, non-MIMO users close to the base station can be served by the secondary antenna and still be able to demodulate the signal without significant degradation.

In this exemplary embodiment, this is carried out by selecting one of the non-MIMO users who are presently being served by the primary antenna (step 403) and determining whether radio conditions for the selected non-MIMO user satisfy predetermined criteria that are deemed to constitute sufficiently good radio conditions (decision block 405). The radio conditions can be easily determined by the UE downlink measurement reports. For example, in UTRAN one can use: Channel Quality Indicator ("CQI"); CPICH Reference Symbol Received Power ("CPICH RSCP"); or CPICH Energy per carrier to Noise Density Ratio ("CPICH Ec/No"). In E-UTRAN, one can use CQI and RSRP. These measurements are available at the network for scheduling or for doing cell change/handover and can be made at the time of call setup or during the call.

If the radio conditions of the selected non-MIMO user do not satisfy the predetermined criteria ("NO" path out of decision block 405), then processing returns to step 403, where another of the non-MIMO users presently served by the primary antenna can be selected and tested. (For the sake of clarity, details such as determining whether any such additional non-MIMO users exist and if not then exiting the routine have been omitted from the figure.)

Once a selected non-MIMO user presently served by the primary antenna and whose radio conditions satisfy the predetermined criteria is found ("YES" path out of decision block 405), the selected non-MIMO user is shifted to one of the secondary antennas (step 407). An identifier of the secondary antenna to be used to serve the non-MIMO user is then communicated to the non-MIMO user (step 409). Some signaling support would be needed to communicate this information. This would allow the UE to use only pilot sequences from that particular antenna for demodulation of the received signal. However, the UE could still use pilots from the primary antenna for long terms pilot measurements that are used for handovers and cell reselection. The above-described approach can work even if there is one cell (i.e. one carrier) per base station.

Processing may then return back to decision block 401 to determine whether the new allocation is now optimum, or whether further load shifting should be attempted.

In another aspect of embodiments consistent with the invention, the network can also shift the load of non-MIMO users to another carrier that has low overall traffic or a low number of MIMO users. The trigger for invoking this load shift at the network can be based on the load of non-MIMO users or overall load in the cells. An advantage of this solution is that a non-MIMO UE can still be served via the primary antenna on another carrier. This is done via a normal handover procedure (i.e., a handover between two co-located cells).

Figure 5:
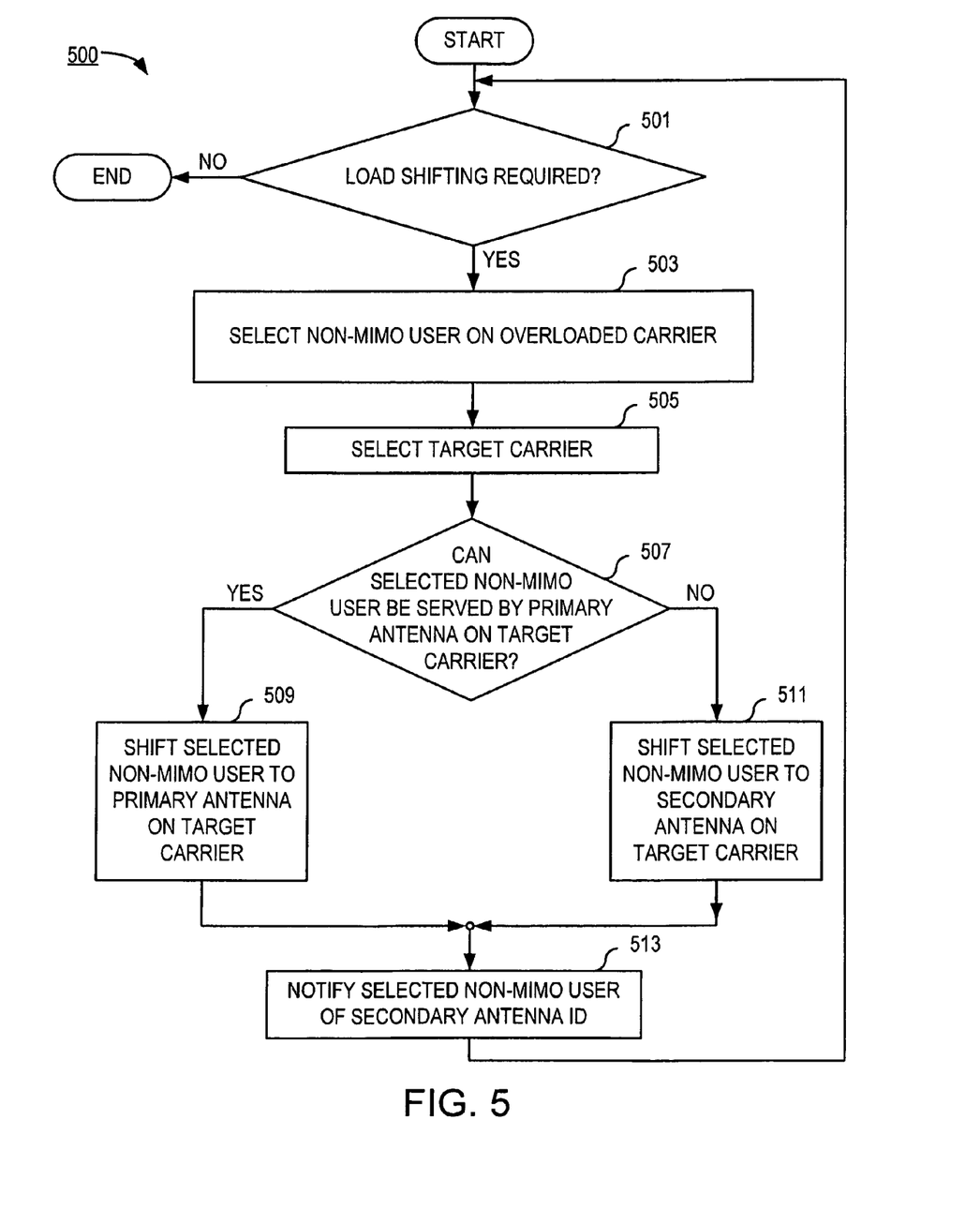
FIG. 5 is, inter alia, a flowchart of exemplary steps/processes carried out in a base station apparatus to handle cases in which a non-optimum allocation of power to one or more transmit antennas has been made.

FIG. 5 is a flowchart of exemplary steps/processes carried out in a base station apparatus to handle such cases. FIG. 5 can also be considered to be a base station apparatus 500 comprising logic configured to carry out the variously described functions.

Accordingly, a determination is made whether load shifting is required (decision block 501). The determination can be based, for example, on the MIMO and non-MIMO factors. If there is an uneven distribution of MIMO and non-MIMO users on a carrier, then load shifting can be carried out. For example, if a non-MIMO user factor is large then some of these users can be moved to another carrier. If load shifting is not required ("NO" path out of decision block 501), then no further actions need be taken.

If load shifting is required ("YES" path out of decision block 501), then a non-MIMO user is selected from those served by the overloaded carrier. A way to make this selection is to first move users with high usage factors. This selection technique has the benefit of requiring that only a few users be moved to release the load on the loaded carrier.

Next, a target carrier is selected (step 505). A way to make this selection is to select a carrier having a low load. For example, non-MIMO users can be moved to a carrier having a low number of non-MIMO users. Following selection of the target carrier, it is next determined whether the selected non-MIMO user can be served by the primary antenna on the target carrier (decision block 507). If it can ("YES" path out of decision block 507), the selected non-MIMO user is re-allocated so that it will be served by the primary antenna of the target carrier (step 509). Otherwise ("NO" path out of decision block 507), the selected non-MIMO user is re-allocated so that it will be served by one of the secondary antennas of the target carrier (step 511). It is beneficial, before making this shift, to determine whether the non-MIMO user's radio conditions are sufficiently good to permit the non-MIMO user to be served by a secondary antenna.

An identifier of the new antenna to be used to serve the non-MIMO user is then communicated to the non-MIMO user (step 513). Some signaling support would be needed to communicate this information. In the event that the non-MIMO user is shifted to a secondary antenna, this signaling would allow the UE to use only pilot sequences from that particular antenna for demodulation of the received signal. However, the UE could still use pilots from the primary antenna for long terms pilot measurements that are used for handovers and cell selection.

Various aspects of the present invention enable a number of advantages, including:
a more efficient use of the base station transmission power;
enabling all users to have good coverage; and
preventing non-MIMO users from being adversely affected by MIMO users.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a base station comprising a plurality of transmit antennas, each of the plurality of transmit antennas transmitting on one or more carriers selected from a set of co-located carriers and serving each of one or more non-MIMO users by only one of the plurality of transmit antennas and each of one or more MIMO users by two or more of the plurality of transmit antennas, said method for allocating a maximum transmission power budget to each of the plurality of transmit antennas comprising:
allocating by one or more processing circuits, for serving each of the one or more MIMO users, one or more carriers selected from the set of co-located carriers;
allocating by one or more processing circuits, for serving each of the one or more non-MIMO users, one or more carriers selected from the set of co-located carriers;
deriving a set of coefficients by using, for each carrier of the set of co-located carriers, information about an amount of allocated MIMO user resources associated with the carrier and an amount of allocated non-MIMO user resources associated with the carrier, wherein each coefficient corresponds to a unique one of the plurality of transmit antennas and represents a proportion of a maximum power budget for the carrier;
deriving a maximum transmission power budget for each of the plurality of transmit antennas by using for each carrier of the set of co-located carriers said set of coefficients and the maximum transmission power budget for the carrier;
deriving for each antenna of the plurality of transmit antennas a total maximum transmission power budget for the antenna by combining the derived maximum transmission power budgets of the carriers transmitted on the antenna;
determining whether the total maximum transmission power budget of the antenna exceeds a transmission power limit for the antenna; and
if the total maximum transmission power budget of the antenna exceeds its transmission power limit and the antenna is a primary antenna of a carrier, determining whether radio conditions for a non-MIMO user satisfy one or more predefined criteria, and causing a secondary antenna of the carrier to be used to serve the non-MIMO user, if the radio conditions of the non-MIMO user satisfy the one or more predefined criteria.

2. The method of claim 1, wherein the allocation of carriers is such that MIMO users and non-MIMO users are distributed equally across all carriers.

3. The method of claim 1, wherein:
the amount of allocated MIMO user resources includes an amount of transmitted power or used channels of the MIMO users in a cell; and
the amount of allocated non-MIMO user resources includes an amount of transmitted power or used channels of the non-MIMO users in the cell.

4. The method of claim 3, wherein the channels are channelization codes of a code division multiple access radio access network.

5. The method of claim 3, wherein the channels are sets of sub-carriers or sets of resource blocks in an orthogonal frequency division multiple access radio access network.

6. The method of claim 1, wherein for each carrier of the set of co-located carriers, one of the plurality of transmit antennas is a primary antenna that serves one or more MIMO users and one or more non-MIMO users, and remaining ones of the plurality of transmit antennas are secondary antennas that serve one or more MIMO users.

7. The method of claim 6, wherein a same one of the plurality of transmit antennas is the primary antenna for all of the carriers.

8. The method of claim 6, wherein a different one of the plurality of transmit antennas is the primary antenna for each of the carriers.

9. The method of claim 8, wherein the set of coefficients form a maximum base station transmission power matrix, $M_{max}^{BS}$, that satisfies:

$$M_{max}^{BS} = P_{max}^C \begin{bmatrix} \left(\frac{\Psi_{MU}}{L} + \Psi_{SU}\right) & \frac{\Psi_{MU}}{L} & K & \frac{\Psi_{MU}}{L} \\ \frac{\Psi_{MU}}{L} & \left(\frac{\Psi_{MU}}{L} + \Psi_{SU}\right) & K & \frac{\Psi_{MU}}{L} \\ M & M & M & M \\ \frac{\Psi_{MU}}{L} & \frac{\Psi_{MU}}{L} & L & \left(\frac{\Psi_{MU}}{L} + \Psi_{SU}\right) \end{bmatrix},$$

wherein:
  each row in the maximum base station transmission power matrix corresponds to a different one of the earners;
  each column in the maximum base station transmission power matrix corresponds to a different one of the antennas;
  L represents a number of transmit antennas;
  $\Psi_{MU}$ is an average MIMO factor that is a function of the amount of allocated MIMO user resources associated with the carriers;
  $\Psi_{SU}$ is an average non-MIMO factor that is a function of the amount of allocated non-MIMO user resources associated with the carriers; and
  $P_{max}^C$ represents the maximum transmission power budget per carrier.

10. The method of claim 8, wherein the set of coefficients form a maximum base station transmission power matrix, $M_{max}^{BS}$, that satisfies:

$$\begin{bmatrix} P_{max}^1\left(\frac{\Psi_{MU}}{L} + \Psi_{SU}\right) & P_{max}^1\frac{\Psi_{MU}}{L} & K & P_{max}^1\frac{\Psi_{MU}}{L} \\ P_{max}^2\frac{\Psi_{MU}}{L} & P_{max}^2\left(\frac{\Psi_{MU}}{L} + \Psi_{SU}\right) & K & P_{max}^2\frac{\Psi_{MU}}{L} \\ M & M & M & M \\ P_{max}^K\frac{\Psi_{MU}}{L} & P_{max}^K\frac{\Psi_{MU}}{L} & L & P_{max}^K\left(\frac{\Psi_{MU}}{L} + \Psi_{SU}\right) \end{bmatrix},$$

wherein:
  K represents a number of carriers;
  L represents a number of transmit antennas;
  each row in the maximum base station transmission power matrix corresponds to a different one of the carriers;
  each column in the maximum base station transmission power matrix corresponds to a different one of the antennas;
  $\Psi_{MU}$ is an average MIMO factor that is a function of the amount of allocated MIMO user resources associated with the carriers;
  $\Psi_{SU}$ is an average non-MIMO factor that is a function of the amount of allocated non-MIMO user resources associated with the carriers; and
  $P_{max}^i$ represents the maximum transmission power budget for carrier i, wherein 1≤i≤K.

11. The method of claim 1, further comprising:
  communicating to a non-MIMO user an identifier of the secondary antenna to be used to serve the non-MIMO user.

12. The method of claim 1, further comprising, for each of one or more of the carriers:
  deriving a total maximum transmission power budget for the carrier by combining the derived maximum transmission power budgets of the antennas for said one of the carriers;
  determining whether the total maximum transmission power budget for the carrier exceeds a transmission power limit for the carrier; and
  if the total maximum transmission power budget for the carrier exceeds the transmission power limit for the carrier, then causing one or more non-MIMO users presently receiving service on the carrier to instead receive service on an available target carrier.

13. The method of claim 12, wherein:
  the non-MIMO users receive service on a primary antenna of the target carrier if the service will not cause a total transmission power of the primary antenna to exceed the total maximum transmission power budget of the primary antenna; and
  the non-MIMO users receive service on one of the secondary antennas of the target carrier if the service will cause a total transmission power of the primary antenna to exceed the total maximum transmission power budget of the primary antenna.

14. The method of claim 1, wherein the set of coefficients form a maximum base station transmission power matrix, $M_{max}^{BS}$ that satisfies:

$$M_{max}^{BS} = P_{max}^C \begin{bmatrix} \left(\frac{\Psi_{MU}}{L} + \Psi_{SU}\right) & \frac{\Psi_{MU}}{L} & K & \frac{\Psi_{MU}}{L} \\ \left(\frac{\Psi_{MU}}{L} + \Psi_{SU}\right) & \frac{\Psi_{MU}}{L} & K & \frac{\Psi_{MU}}{L} \\ M & M & M & M \\ \left(\frac{\Psi_{MU}}{L} + \Psi_{SU}\right) & \frac{\Psi_{MU}}{L} & L & \frac{\Psi_{MU}}{L} \end{bmatrix},$$

wherein:
  each row in the maximum base station transmission power matrix corresponds to a different one of the carriers;
  each column in the maximum base station transmission power matrix corresponds to a different one of the antennas;
  L represents a number of transmit antennas;
  $\Psi_{MU}$ is an average MIMO factor that is a function of the amount of allocated MIMO user resources associated with the carriers;
  $\Psi_{SU}$ is an average non-MIMO factor that is a function of the amount of allocated non-MIMO user resources associated with the carriers; and
  $P_{max}^C$ represents the maximum transmission power budget per carrier.

15. The method of claim 1, wherein the set of coefficients form a maximum base station transmission power matrix, $M_{max}^{BS}$, that satisfies:

$$M_{max}^{BS} = P_{max}^{C} \begin{bmatrix} \left(\frac{\Psi_{MU}}{L} + \Psi_{SU}\right) & \frac{\Psi_{MU}}{L} & K & \frac{\Psi_{MU}}{L} \\ \frac{\Psi_{MU}}{L} & \left(\frac{\Psi_{MU}}{L} + \Psi_{SU}\right) & K & \frac{\Psi_{MU}}{L} \\ M & M & M & M \\ \frac{\Psi_{MU}}{L} & \frac{\Psi_{MU}}{L} & L & \left(\frac{\Psi_{MU}}{L} + \Psi_{SU}\right) \end{bmatrix},$$

wherein:
  each row in the maximum base station transmission power matrix corresponds to a different one of the earners;
  each column in the maximum base station transmission power matrix corresponds to a different one of the antennas;
  L represents a number of transmit antennas;
  $\Psi_{MU}$ is an average MIMO factor that is a function of the amount of allocated MIMO user resources associated with the carriers;
  $\Psi_{SU}$ is an average non-MIMO factor that is a function of the amount of allocated non-MIMO user resources associated with the carriers; and
  $P_{max}^{C}$ represents the maximum transmission power budget per carrier.

16. The method of claim 1, wherein the set of coefficients form a maximum base station transmission power matrix, $M_{max}^{BS}$, that satisfies:

$$\begin{bmatrix} P_{max}^{1}\left(\frac{\Psi_{MU}}{L} + \Psi_{SU}\right) & P_{max}^{1}\frac{\Psi_{MU}}{L} & K & P_{max}^{1}\frac{\Psi_{MU}}{L} \\ P_{max}^{2}\left(\frac{\Psi_{MU}}{L} + \Psi_{SU}\right) & P_{max}^{2}\frac{\Psi_{MU}}{L} & K & P_{max}^{2}\frac{\Psi_{MU}}{L} \\ M & M & M & M \\ P_{max}^{K}\left(\frac{\Psi_{MU}}{L} + \Psi_{SU}\right) & P_{max}^{K}\frac{\Psi_{MU}}{L} & L & P_{max}^{K}\frac{\Psi_{MU}}{L} \end{bmatrix},$$

wherein:
  K represents a number of carriers;
  L represents a number of transmit antennas;
  each row in the maximum base station transmission power matrix corresponds to a different one of the carriers;
  each column in the maximum base station transmission power matrix corresponds to a different one of the antennas;
  $\Psi_{MU}$ is an average MIMO factor that is a function of the amount of allocated MIMO user resources associated with the carriers;
  $\Psi_{SU}$ is an average non-MIMO factor that is a function of the amount of allocated non-MIMO user resources associated with the carriers; and
  $P_{max}^{i}$ represents the maximum transmission power budget for carrier i, wherein $1 \le i \le K$.

17. The method of claim 1, wherein the set of coefficients form a maximum base station transmission power matrix, $M_{max}^{BS}$, that satisfies:

$$\begin{bmatrix} P_{max}^{1}\left(\frac{\Psi_{MU}}{L} + \Psi_{SU}\right) & P_{max}^{1}\frac{\Psi_{MU}}{L} & K & P_{max}^{1}\frac{\Psi_{MU}}{L} \\ P_{max}^{2}\frac{\Psi_{MU}}{L} & P_{max}^{2}\left(\frac{\Psi_{MU}}{L} + \Psi_{SU}\right) & K & P_{max}^{2}\frac{\Psi_{MU}}{L} \\ M & M & M & M \\ P_{max}^{K}\frac{\Psi_{MU}}{L} & P_{max}^{K}\frac{\Psi_{MU}}{L} & L & P_{max}^{K}\left(\frac{\Psi_{MU}}{L} + \Psi_{SU}\right) \end{bmatrix},$$

wherein:
  K represents a number of carriers;
  L represents a number of transmit antennas;
  each row in the maximum base station transmission power matrix corresponds to a different one of the carriers;
  each column in the maximum base station transmission power matrix corresponds to a different one of the antennas;
  $\Psi_{MU}$ is an average MIMO factor that is a function of the amount of allocated MIMO user resources associated with the carriers;
  $\Psi_{SU}$ is an average non-MIMO factor that is a function of the amount of allocated non-MIMO user resources associated with the carriers; and
  $P_{max}^{i}$ represents the maximum transmission power budget for carrier i, wherein $1 \le i \le K$.

18. A base station apparatus comprising:
  a plurality of transmit antennas;
  one or more processing circuits configured to perform Multiple Input/Multiple Output (MIMO) processing to serve one or more MIMO users, and configured to serve one or more non-MIMO users;
  wherein each of the plurality of transmit antennas transmits on one or more carriers selected from a set of co-located carriers; and
  wherein each of the one or more non-MIMO users is served by only one of the plurality of transmit antennas and each of the one or more MIMO users is served by two or more of the plurality of transmit antennas; and,
  wherein the base station apparatus allocates a maximum transmission power budget to each of the plurality of transmit antennas based on said one or more processing circuits being configured to:
  allocate, for serving each of the one or more MIMO users, one or more carriers selected from the set of co-located carriers;
  allocate, for serving each of the one or more non-MIMO users, one or more carriers selected from the set of co-located carriers;
  derive a set of coefficients by using, for each carrier of the set of co-located carriers, information about an amount of allocated MIMO user resources associated with the carrier and an amount of allocated non-MIMO user resources associated with the carrier, wherein each coefficient corresponds to a unique one of the antennas and represents a proportion of a maximum power budget for the carrier;
  derive a maximum transmission power budget for each of the plurality of transmit antennas by using for each carrier of the set of co-located carriers said set of coefficients and the maximum transmission power budget for the carrier;
  derive for each antenna of the plurality of transmit antennas a total maximum transmission power budget for the antenna by combining the derived maximum transmission power budgets of the carriers transmitted on the antenna;

determine whether the total maximum transmission power budget of the antenna exceeds a transmission power limit for the antenna; and if the total maximum transmission power budget of a primary antenna of a carrier exceeds its transmission power limit, determine whether radio conditions for a non-MIMO user satisfy one or more predefined criteria, and, if the radio conditions of the non-MIMO user satisfy the one or more predefined criteria, cause one of secondary antennas of the carrier to be used to serve the non-MIMO user.

* * * * *